J. P. IBSON.
KITCHEN UTENSIL.
APPLICATION FILED FEB. 5, 1910.
958,875.
Patented May 24, 1910.
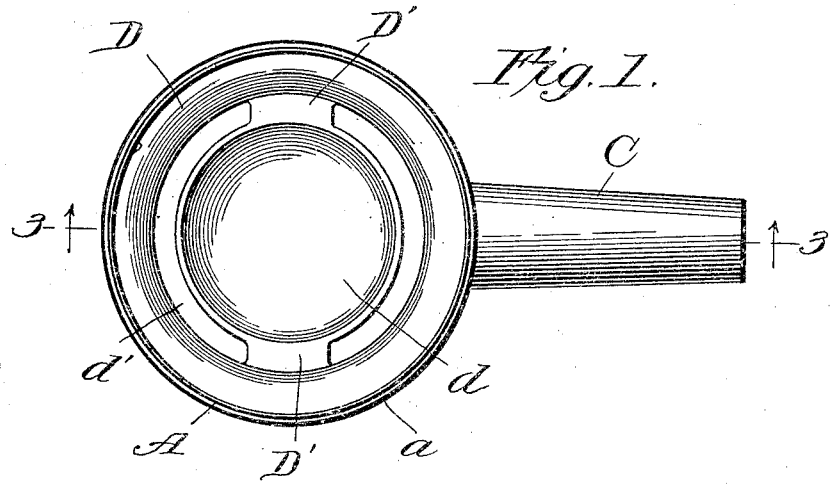
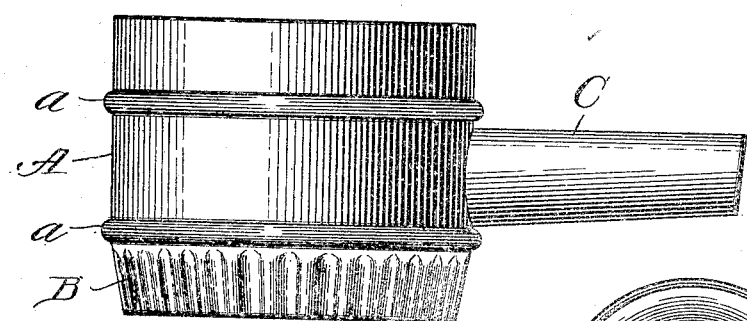
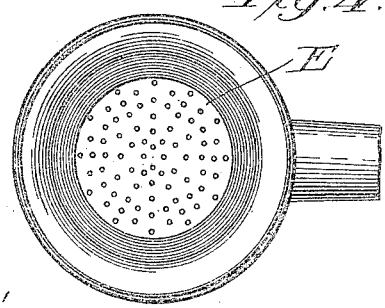
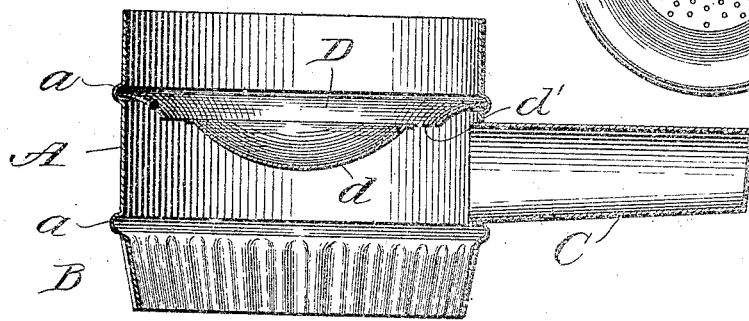
Witnesses:
Harry S. Gaither
E. K. Lundy
Inventor:
John P. Ibson
by Franks D. Thomason
atty

UNITED STATES PATENT OFFICE.

JOHN P. IBSON, OF DENVER, COLORADO.

KITCHEN UTENSIL.

958,875. Specification of Letters Patent. Patented May 24, 1910.

Application filed February 5, 1910. Serial No. 542,296.

*To all whom it may concern:*

Be it known that I, JOHN P. IBSON, a citizen of the United States, residing at Denver, in the county of Denver and State of Colorado, have invented new and useful Improvements in Kitchen Utensils, of which the following is a full, clear, and exact description.

My invention relates to culinary utensils that are adapted for use in kitchens and buffets, which will perform in a novel and efficient manner any one of several operations necessary in the preparation of edibles or beverages.

The object of my invention is to so construct and arrange this very simple utensil that it may be stamped out of sheet-metal and readily assembled for little cost.

It is also an object of my invention to so arrange the parts that one of them may be removed for the purpose of substituting another of the same kind, therefor, or one having a different function. This I accomplish by the means and in the manner hereinafter described and as more particularly pointed out in the claims, reference being had to the accompanying drawings forming a part hereof, in which, Figure 1 is a top plan view of my improved utensil. Fig. 2 is a side elevation of the same, and Fig. 3 is a central longitudinal vertical section thereof taken on line 3—3, Fig. 1. Fig. 4 is a detached plan view, drawn to a reduced scale, of a cup-shaped strainer for use in connection therewith.

Referring to the drawings, it will be observed that the main body of my invention comprises a hollow cylindrical metal shell A, that is provided with one or more ribs or beads $a$ that extend around the same with its concave side on the inner side of the shell mediate the upper and lower edges of the latter. The lower edge B is preferably fluted and provided with vertically arranged corrugations extending downwardly from the lower bead $a$, for the purpose of forming a cutting edge for shaping the scalloped edges of fancy cakes and the like. The upper edge of the shell A is left smooth and circular to provide a biscuit cutter. A substantially circular opening is cut in the vertical wall of the shell mediate the beads $a$ and a tapering cylindrical tube C of sheet metal is soldered or otherwise secured therein and projecting outwardly a distance sufficient to form a handle for manipulating the rest of the utensil and constituting a corer for apples and the like. This handle is preferably open at both ends and its axis is slightly oblique to the vertical plane of the adjacent side of the shell in order that the cores passing through the handle will escape the egg-separator or strainer hereinafter described.

In the recess formed in the inner surface of the shell by the upper bead $a$, a receptacle D is seated that is preferably provided with a centrally disposed cup or dish $d$. The upper edge of this cup terminates in an annular ledge, from the outer edge of which latter the receptacle is curved upward and outward to its outer circumferential edge, the diameter of which is such that when it is inserted in the cylindrical shell A it has to be sprung into its seat formed by the concave side of the bead $a$. In the ledge, slot $d'$ are cut concentric with the cup $d$. This device just described is for the purpose of separating the yolks from the whites of eggs, the former filling the cup and the latter overflowing through the slot $d'$ into any suitable dish or vessel placed conveniently below it.

The device shown in Fig. 4 of the drawings, is a strainer adapted to be used or substituted for the receptacle D above described. This strainer E is preferably of the same shape in transverse section as the egg separator, but the slots are omitted and instead it is perforated to form a strainer. When it is desired to use the utensil for a strainer, the egg-separator is simply forced out of the seat in bead $a$ and the strainer attachment forced into place.

What I claim as new is:—

1. A utensil comprising a shell open at opposite ends and provided with a rib and a removable perforate plate seated with relation to said rib.

2. A utensil comprising a cylindrical shell having open ends, a rib extending around the same, a perforate plate seated with relation to said rib, and a tubular member projecting laterally from said shell.

3. A utensil comprising a cylindrical shell having open ends, a rib extending around said shell and forming a recess on the inner surface thereof, a removable perforate plate seated in said recess, and a tubular member projecting laterally from said shell.

4. A utensil comprising a cylindrical shell having open ends, a rib extending around the same, a perforate plate seated with relation to said rib, and a tubular member projecting laterally from said shell, and open at its ends.

5. A utensil comprising a cylindrical shell having open ends, a rib extending around said shell and forming a recess on the inner surface thereof, a removable perforate plate seated in said recess, and a tubular member projecting laterally from said shell, and open at its ends.

6. A utensil comprising a shell open at opposite ends and provided with a rib and a removable perforate plate seated with relation to said rib, and having a centrally disposed concavo-convex portion.

7. A utensil comprising a cylindrical shell having open ends, a rib extending around the same, a perforate plate seated with relation to said rib and having a centrally disposed concavo-convex portion, and a tubular member projecting laterally from said shell.

8. A utensil comprising a cylindrical shell having open ends, a rib extending around said shell and forming a recess on the inner surface thereof, a removable perforate plate seated in said recess and having a centrally disposed concavo-convex portion, and a tubular member projecting laterally from said shell.

9. A utensil comprising a shell open at both ends and having its edge at one end fluted and provided with a circumferential bead the concave side of which is on the inner surface of said wall, and a removable perforate receptacle having a centrally disposed concave bottom and having its edges seated in the concave side of said bead.

10. A utensil comprising a shell open at both ends and having its edge at one end fluted and provided with a circumferential bead the concave side of which is on the inner surface of said wall, and a removable perforate receptacle having a centrally disposed concave bottom and having its edges sprung into and seated in the concave side of said bead.

11. A utensil comprising a shell open at both ends and having its edge at one end fluted and provided with a circumferential bead the concave side of which is on the inner surface of said wall, a removable perforate receptacle having a centrally disposed concave bottom and having its edges seated in the concave side of said bead, and a tubular handle for said shell.

12. A utensil comprising a shell open at both ends and having its edge at one end fluted and provided with a circumferential bead the concave side of which is on the inner surface of said wall, a removable perforate receptacle having a centrally disposed concave bottom and having its edges seated in the concave side of said bead, and a tubular handle for said shell the outer end of which is less in diameter than the inner end.

13. A utensil comprising a shell open at both ends and having its edge at one end fluted and provided with a circumferential bead the concave side of which is on the inner surface of said wall, a removable perforate receptacle having a centrally disposed concave bottom and having its edges seated in the concave side of said bead, and a tapering tubular hand for said shell open at both ends.

14. A utensil comprising a shell open at both ends and having its edge at one end fluted and provided with a circumferential bead the concave side of which is on the inner surface of said wall, a removable perforate receptacle having a centrally disposed concave bottom and having its edges seated in the concave side of said bead, and a tubular handle for said shell the axis of which is oblique to the axis of said shell.

15. A utensil comprising a shell open at both ends and having its edge at one end fluted and provided with a circumferential bead the concave side of which is on the inner surface of said wall, a removable perforate receptacle having a centrally disposed concave bottom and having its edges seated in the concave side of said bead, and a tapering tubular handle for said shell open at both ends and the axis of which is oblique to the axis of said shell.

In witness whereof I have hereunto set my hand this 31st day of January, 1910.

JOHN P. IBSON.

Witnesses:
M. E. MARTIN,
E. K. LUNDY.